United States Patent
Chadha et al.

(10) Patent No.: US 11,119,890 B2
(45) Date of Patent: Sep. 14, 2021

(54) INSTRUCTION LEVEL TRACING FOR ANALYZING PROCESSOR FAILURE

(71) Applicant: International Business Machines Corporation, Armonk, NY (US)

(72) Inventors: Saurabh Chadha, Bangalore (IN); Daniel Lewis, Bangalore (IN); Diyanesh B. Chinnakkonda Vidyapoornachary, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 98 days.

(21) Appl. No.: 16/553,991

(22) Filed: Aug. 28, 2019

(65) Prior Publication Data

US 2021/0064513 A1 Mar. 4, 2021

(51) Int. Cl.
| | |
|---|---|
| *G06F 11/00* | (2006.01) |
| *G06F 11/36* | (2006.01) |
| *G06F 11/273* | (2006.01) |
| *G06F 11/07* | (2006.01) |
| *G06F 11/34* | (2006.01) |

(52) U.S. Cl.
CPC ...... *G06F 11/3636* (2013.01); *G06F 11/0721* (2013.01); *G06F 11/0751* (2013.01); *G06F 11/273* (2013.01); *G06F 11/348* (2013.01)

(58) Field of Classification Search
CPC .................................................. G06F 11/348
See application file for complete search history.

(56) References Cited

U.S. PATENT DOCUMENTS

| | | | | |
|---|---|---|---|---|
| 7,506,216 B2* | 3/2009 | Bose | .............. | G06F 11/008 703/14 |
| 7,774,668 B2* | 8/2010 | Duale | ............ | G01R 31/318385 714/738 |
| 8,176,475 B2* | 5/2012 | Kosche | ............... | G06F 11/3447 717/127 |
| 9,632,913 B2* | 4/2017 | Deakin | ............... | G06F 11/3644 |
| 9,720,036 B2* | 8/2017 | Deutsch | .............. | G06F 11/3636 |
| 10,528,448 B2* | 1/2020 | Mitra | ................... | G06F 11/3003 |
| 10,732,221 B2* | 8/2020 | Deutsch | .............. | G06F 11/3636 |
| 2002/0178405 A1* | 11/2002 | McCullough | ....... | G06F 11/3656 714/45 |
| 2003/0135718 A1* | 7/2003 | DeWitt, Jr. | ......... | G06F 11/3476 712/227 |

(Continued)

*Primary Examiner* — Jonathan D Gibson
(74) *Attorney, Agent, or Firm* — Cantor Colburn LLP; Bryan Bortnick

(57) ABSTRACT

A computer-implemented method for instruction-level tracing for analyzing processor failure includes detecting a failure during operation of a processor circuit. The method further includes parsing a miscompare trace to determine a plurality of opcodes executed by the processor prior to the failure. The method further includes generating a workload comprising a set of opcodes by filtering the set of opcodes from the miscompare trace. The method further includes performing a consistency check of the workload to determine a commit ratio of the workload, the commit ratio indicative of a number of times the failure occurs when the workload is executed a predetermined number of times. The method further includes using the workload for debugging the failure based on the commit ratio being above a predetermined threshold.

20 Claims, 10 Drawing Sheets

(56) References Cited

U.S. PATENT DOCUMENTS

| | | | |
|---|---|---|---|
| 2004/0030962 A1* | 2/2004 | Swaine | G06F 11/348 |
| | | | 714/45 |
| 2004/0064685 A1* | 4/2004 | Nguyen | G06F 11/348 |
| | | | 712/227 |
| 2005/0257078 A1* | 11/2005 | Bose | G06F 11/008 |
| | | | 714/1 |
| 2008/0077835 A1* | 3/2008 | Khoche | G11C 29/44 |
| | | | 714/733 |
| 2011/0087861 A1* | 4/2011 | Bertacco | G06F 11/263 |
| | | | 712/202 |
| 2013/0247010 A1* | 9/2013 | Bradbury | G06F 11/3466 |
| | | | 717/130 |
| 2014/0310561 A1* | 10/2014 | Zhang | G06F 11/3636 |
| | | | 714/38.1 |
| 2015/0006969 A1* | 1/2015 | Hanssen | G06F 11/3037 |
| | | | 714/45 |
| 2015/0127983 A1* | 5/2015 | Trobough | G06F 11/2733 |
| | | | 714/30 |
| 2015/0143343 A1* | 5/2015 | Weiss | G01R 31/31705 |
| | | | 717/128 |
| 2015/0186227 A1* | 7/2015 | Kolassery | G06F 11/3636 |
| | | | 714/763 |
| 2015/0186250 A1* | 7/2015 | Friedler | G06F 11/22 |
| | | | 717/124 |
| 2015/0193328 A1* | 7/2015 | Deakin | G06F 9/45558 |
| | | | 714/38.1 |
| 2015/0268293 A1* | 9/2015 | Bertacco | G01R 31/31707 |
| | | | 702/109 |
| 2016/0047859 A1* | 2/2016 | Deutsch | G01R 31/31705 |
| | | | 714/734 |
| 2017/0255535 A1* | 9/2017 | Freeman | G06F 11/349 |
| 2017/0299655 A1* | 10/2017 | Deutsch | G01R 31/31705 |
| 2019/0004921 A1* | 1/2019 | Fahim | G06F 11/1446 |
| 2019/0354419 A1* | 11/2019 | Matsumoto | G06F 11/0754 |

\* cited by examiner

INSTRUCTION LEVEL TRACING FOR ANALYZING PROCESSOR FAILURE

BACKGROUND

The present invention generally relates to computer technology, and more specifically, to analyzing failure in processor operation by facilitating debugging of the hardware of the processor.

Modern complementary metal-oxide-semiconductor (CMOS) technology has enabled the integration of hundreds of components in a single silicon chip. Recent advances in three-dimensional (3D) stacking of integrated circuits (ICs) and other components using through-silicon vias (TSVs) promise even denser integration in a single package. The production process flow generally involves pre-fabrication (or "pre-silicon") simulations, followed by post-fabrication (or "post-silicon") debug and validation. Despite steady progress in pre-silicon verification methods and tools, first silicon—the initial run of a fabrication process for a particular design—is rarely bug-free. However, the post-silicon debug of such highly integrated systems is one of the major challenges for the feasibility of commercial systems.

Post-fabrication/post-silicon debug requires a relatively large engineering effort, accounting for a significant portion of the total time-to-market of the silicon product and this portion has been projected to grow. In order to keep pace with advances in system-level integration, including 3D stacking, traditional methodologies for bug localization need to be improved.

SUMMARY

According to one or more embodiments of the present invention, a computer-implemented method for instruction-level tracing for analyzing processor failure includes detecting a failure during operation of a processor circuit. The method further includes parsing a miscompare trace to determine a plurality of opcodes executed by the processor prior to the failure. The method further includes generating a workload comprising a set of opcodes by filtering the set of opcodes from the miscompare trace. The method further includes performing a consistency check of the workload to determine a commit ratio of the workload, the commit ratio indicative of a number of times the failure occurs when the workload is executed a predetermined number of times. The method further includes using the workload for debugging the failure based on the commit ratio being above a predetermined threshold.

According to one or more embodiments of the present invention, a system includes a memory, and a processor coupled to the memory. The processor performs a method for instruction-level tracing for analyzing processor failure includes detecting a failure during operation of a processor circuit. The method further includes parsing a miscompare trace to determine a plurality of opcodes executed by the processor prior to the failure. The method further includes generating a workload comprising a set of opcodes by filtering the set of opcodes from the miscompare trace. The method further includes performing a consistency check of the workload to determine a commit ratio of the workload, the commit ratio indicative of a number of times the failure occurs when the workload is executed a predetermined number of times. The method further includes using the workload for debugging the failure based on the commit ratio being above a predetermined threshold.

According to one or more embodiments of the present invention, a computer program product includes a computer readable storage medium that has program instructions embodied therewith. The program instructions are executable by a processing circuit to cause the processing circuit to perform a method for instruction-level tracing for analyzing processor failure includes detecting a failure during operation of a processor circuit. The method further includes parsing a miscompare trace to determine a plurality of opcodes executed by the processor prior to the failure. The method further includes generating a workload comprising a set of opcodes by filtering the set of opcodes from the miscompare trace. The method further includes performing a consistency check of the workload to determine a commit ratio of the workload, the commit ratio indicative of a number of times the failure occurs when the workload is executed a predetermined number of times. The method further includes using the workload for debugging the failure based on the commit ratio being above a predetermined threshold.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
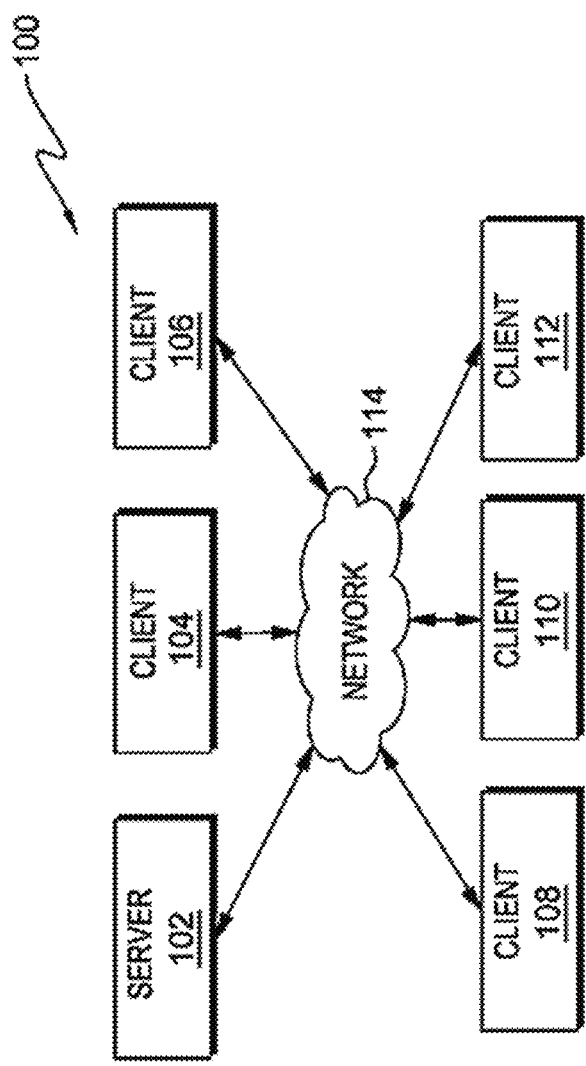
FIGS. 1 and 2 collectively make up a functional block diagram illustrating various portions of a processing system according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describe having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three-digit reference numbers. With minor exceptions, the leftmost digit(s) of each reference number corresponds to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Debugging failures "in post-silicon" is a technically challenging task. One of the recognized technical challenges, when compared to "pre-silicon" stage debugging is the lack of observability. The failures seen in post-silicon can be of various types ranging from failures with memory or register (collectively herein called reg/mem) miscompares, unexpected interrupts to more severe errors like machine checks. Debugging frequently involves finding a root cause of a failure so that appropriate fixes can be implemented.

Conventional tools, called exercisers, operate in the post-silicon stage to validate the silicon using at least one of the following approaches: (i) consistency; and/or (ii) reference-based. Debugging reg/mem miscompares in both these approaches tends to be a time-consuming task. The time required to debug miscompares can vary depending on various factors like test case package size, memory footprint used by the test case, repeatability issues, and other scenario-specific factors.

System-level test impacts yield significantly due to a variety of circuit driven fail exposures. One such exposure is the core miscompare fails due to data integrity issues, that occur during computation or data flow in the pipelines. System-level exercisers can provide miscompare traces, which contain miscompare details and instruction streams executed just before the fault condition. However, for a miscompare fail, there are typically a large number (e.g., hundreds) of miscompares generated. Identifying the correct set of instructions that can drive (i.e., reliably cause) the fail at subsequent execution of that set of instructions is tedious, and can be a technical challenge.

Another, type of exposure can be controlled path fails, which manifest as core/thread hang or like a specific signature (e.g., load-store unit static RAM (LSU SRAM) parity error or ISU Register File). Typically, for various circuit fails, there are specific narrow sets of events that drives the failure. Typically, a general-purpose workload is constructed with all/various instructions to generate events of interest. However, such an instruction set along with circuit variability skews the failing cycle and therefore the failing cycle does not converge, making it difficult to cause the failure to reoccur reliably, and in turn to debug the failure.

In this context, there are multiple technical challenges. First is identifying a set of instructions that can drive the failure of interest. Further, generating a set of instructions, that can drive the failure consistently for "cycle repro", i.e., reproducing, reliably, a sequence of events that causes the circuit (e.g., processor) to perform an operation that leads to the failure. In this case, the sequence of events represents a sequence of instruction cycles.

One or more embodiments of the present invention address such technical challenges to arrive at one or more workloads with a minimal set of instructions, in an efficient manner, in order to achieve consistent cycle repro process and further optimization to achieve coverage of interest. The one or more embodiments of the present invention facilitate creating the instruction sets depending on the failure type.

For example, in case of miscompare fails, one or more embodiments of the present invention use miscompare traces from bare metal software stack, that were originated out of miscompares at the time of failure. Instructions with a high repetition rate above a threshold are filtered from such miscompare traces, and a workload is created by applying static, dynamic, and elimination algorithms to create an instruction set. Further, a consistent fail check is executed (run) over N runs for cycle repro, where N can be a predetermined integer.

Alternatively, or in addition, in case of a core/thread hang type of failure, one or more embodiments of the present invention uses one instruction search at a time supported by the processor architecture and iterates this step over all opcodes. Workload/instruction loops are identified that match a predetermined signature. For example, the signature from each instruction loop (IL) is compared with each opcode to determine a match. Each IL is derived from a single opcode. Because the signature from the fails is already known (predetermined), an IL that matches the predetermined signature has to be identified. Further, a consistent fail check is run over N runs for cycle repro.

Here, specific error signatures are used for failures in specific components of the processor, such as load-store unit (LSU), vector/scalar execution unit (VSU), instruction fetch unit (IFU), instruction sequence unit (ISU), etc. A set of opcodes is selected depending on the failing signature and iterated through one by one. For example, for VSU—All VSX based opcodes, LSU—All load/store related opcodes, are used. Further, workload/instruction loops which match the signature (Each Instruction loop (IL)→each opcode) are identified. Further yet, a consistent fail check is run over N runs for cycle repro.

Once instruction loops of interest are identified, a method of optimization to achieve intended coverage of interest is determined and provided. For example, the optimization is determined using a tunneling procedure covering quantification and ranking based on coverage (power, thermal, frequency, and voltage margin).

One or more embodiments of the present invention accordingly narrow down the circuit failure of interest and also achieve specific coverage of interest.

Figure 2:
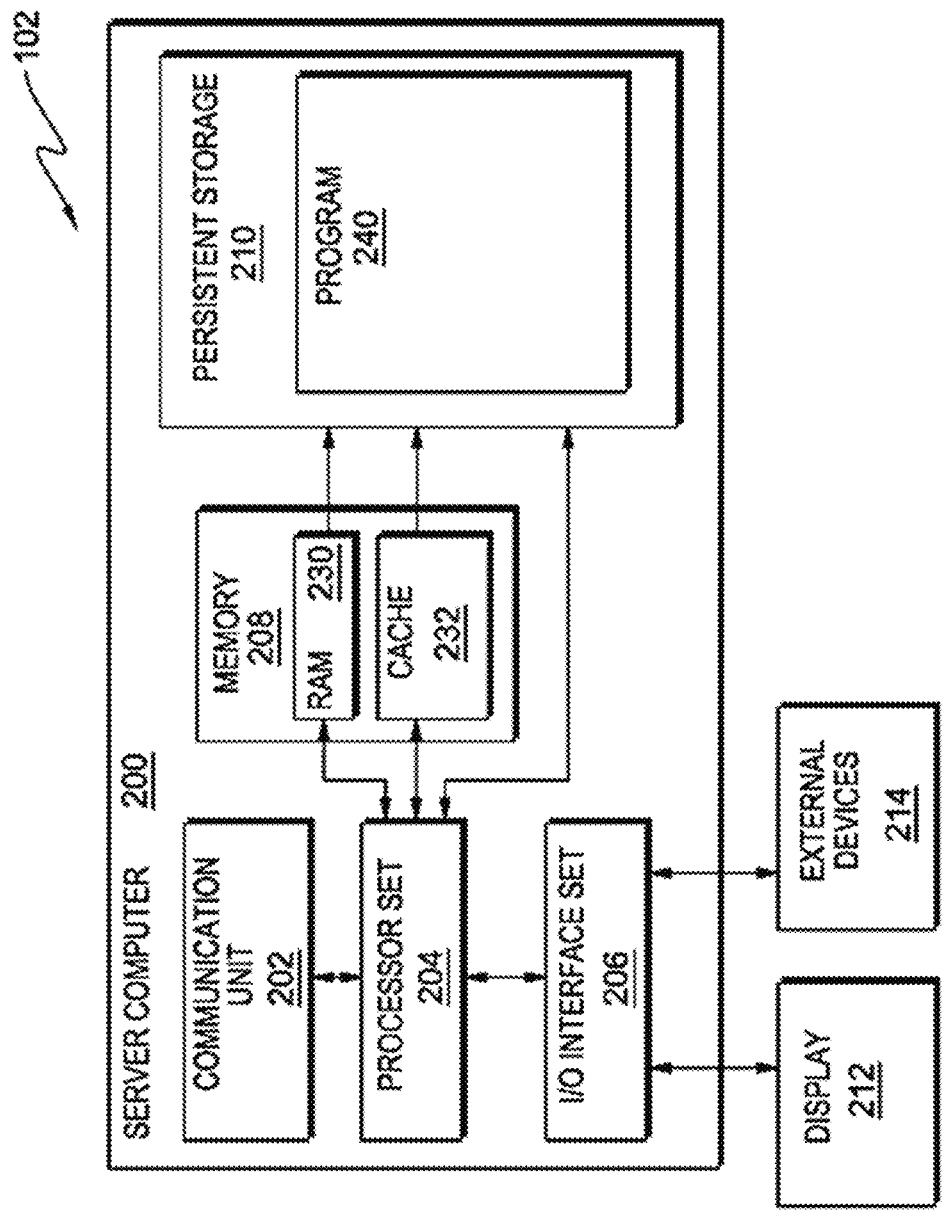

Referring now to the drawings, FIGS. 1 and 2 collectively make up a functional block diagram illustrating various portions of a processing system 100, including server computer sub-system (that is, a portion of the larger computer system that itself includes a computer) 102; client computer sub-systems 104, 106, 108, 110, 112; communication network 114; server computer 200; communication unit 202; processor set 204; input/output (i/o) unit 206; memory device 208; persistent storage device 210; display device 212; external device set 214; random access memory (RAM) devices 230; cache memory device 232; and program 240. It should be noted that in one or more embodiments of the present invention the processing system may include a single computer sub-system and not a distributed computer system as shown here.

As shown in FIG. 2, server computer sub-system 102 is, in many respects, representative of the various computer sub-system(s) in the present invention. Accordingly, several portions of computer sub-system 102 will now be discussed in the following paragraphs.

Server computer sub-system 102 may be a laptop computer, tablet computer, netbook computer, personal computer (PC), a desktop computer, a personal digital assistant (PDA), a smart-phone, or any programmable electronic device capable of communicating with the client sub-systems via network 114. Program 240 is a collection of machine-readable instructions and/or data that is used to create, manage and control certain software functions that will be discussed in detail, below, in the First Embodiment(s) sub-section of this Detailed Description section.

Server computer sub-system 102 is capable of communicating with other computer sub-systems via network 114 (see FIG. 1). Network 114 can be, for example, a local area network (LAN), a wide area network (WAN) such as the Internet, or a combination of the two, and can include wired, wireless, or fiber-optic connections. In general, network 114 can be any combination of connections and protocols that will support communications between server and client sub-systems.

It should be appreciated that FIGS. 1 and 2, taken together, provide only an illustration of one implementation (that is, system 100) and does not imply any limitations with regard to the environments in which different embodiments of the present invention may be implemented. Many modifications to the depicted environment may be made, especially with respect to current and anticipated future advances in cloud computing, distributed computing, smaller computing devices, network communications and the like.

As shown in FIG. 2, server computer sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communication, and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that now and/or in the near future: (i) external device(s) 214 may be able to supply, some or all, memory for sub-system 102; and/or (ii) devices external to sub-system 102 may be able to provide memory for sub-system 102.

Program 240 is stored in persistent storage 210 for access and/or execution by one or more of the respective computer processors 204, usually through one or more memories of memory 208. Persistent storage 210: (i) is at least more persistent than a signal in transit; (ii) stores the device on a tangible medium (such as magnetic or optical domains); and (iii) is substantially less persistent than permanent storage. Alternatively, data storage may be more persistent and/or permanent than the type of storage provided by persistent storage 210.

Program 240 may include both machine-readable and performable instructions and/or substantive data (that is, the type of data stored in a database). In this particular embodiment, persistent storage 210 includes a magnetic hard disk drive. To name some possible variations, persistent storage 210 may include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102, such as client subsystems 104, 106, 108, 110, 112. In these examples, communications unit 202 includes one or more network interface cards. Communications unit 202 may provide communications through the use of either or both physical and wireless communications links. Any computer-executable instructions discussed herein may be downloaded to a persistent storage device (such as persistent storage device 210) through a communications unit (such as communications unit 202).

I/O interface(s) 206 allows for input and output of data with other devices that may be connected locally in data communication with server computer 200. For example, I/O interface 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Computer-executable instructions and data used to practice embodiments of the present invention, for example, program 240, can be stored on such portable computer-readable storage media. In these embodiments, the relevant computer-executable instructions may (or may not) be loaded, in whole or in part, onto persistent storage device 210 via I/O interface set 206. I/O interface set 206 also connects in data communication with display device 212.

Display device 212 provides a mechanism to display data to a user and maybe, for example, a computer monitor or a smartphone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Figure 3:
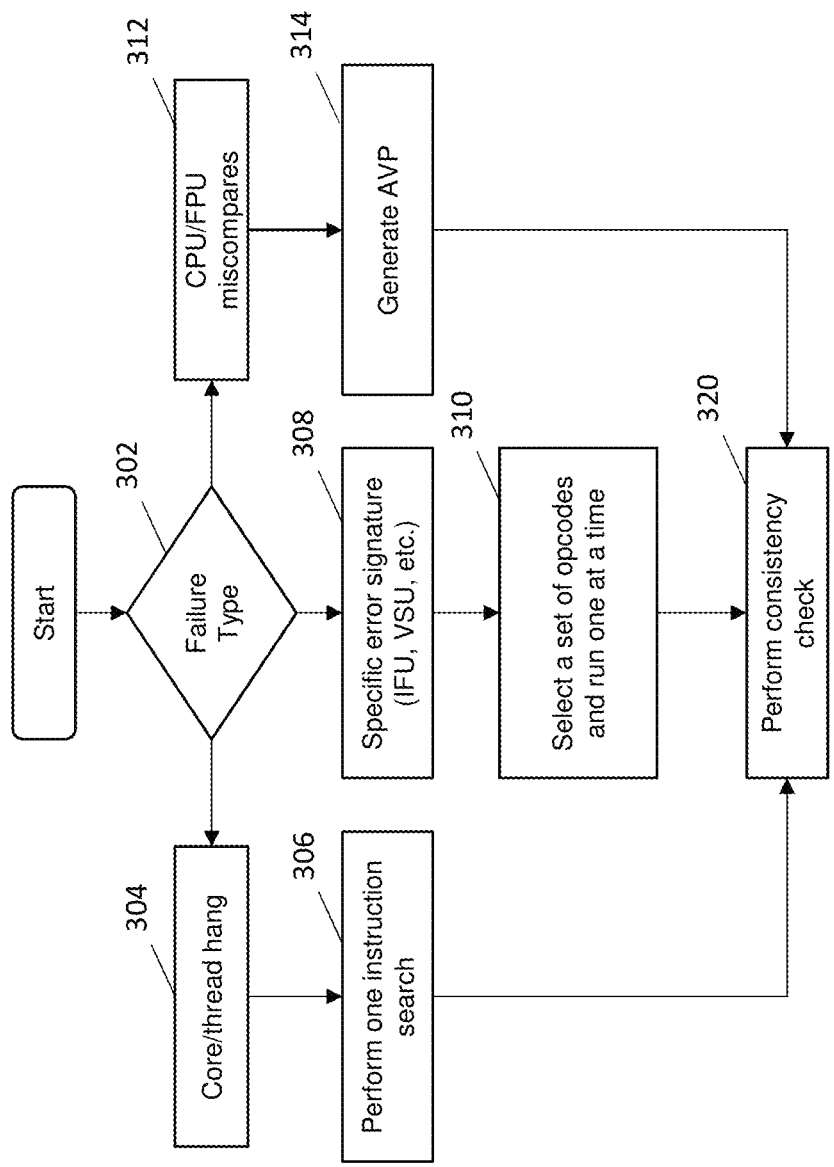
FIG. 3 depicts a flowchart for a method for instruction-level tracing for processor failure analysis according to one or more embodiments of the present invention.

FIG. 3 depicts a flowchart for a method for instruction-level tracing for processor failure analysis according to one or more embodiments of the present invention. The method is initiated when a processor failure has occurred so as to analyze the failure and generate a set of instructions that can consistently cause the same failure to occur. The method includes detecting a type of failure that occurred, at block 302.

If it is determined that the type of failure is a core/thread hang, the method includes performing an instruction search, at blocks 304 and 306. The instruction search (304) includes identifying the opcode that caused the core/thread hang occurrence. The identified opcode is then used as the sequence of instructions, in this case, just a single instruction, to be used for repeatedly causing the core/thread hang failure.

Alternatively, if the type of failure is one from a predetermined list of failures, the method includes selecting a set of opcodes and running each opcode at a time, at blocks 308 and 310. The predetermined list of failures includes a set of specific error signatures. If the detected failure has a signature that matches those from the predetermined list, the failure is deemed to be of the predetermined list. The specific error signatures can correspond to specific components of the processor, such as the LSU, the ISU, the VSU, the IFU, etc. accordingly, the failure can be deemed to be associated with one of the components based on the error signature matching a signature of the detected failure.

Based on the signature of the detected failure, the set of instructions for repeating the failure is created by selecting the set of opcodes specific to the component that experienced the failure. For example, if the VSU experienced the failure, all VSX based opcodes are filtered from the instruction trace and used as the sequence of operations for causing the failure. Alternatively, if the LSU experiences the failure, all load/store related opcodes are filtered and used. In the same manner, opcodes specific to any other component can be filtered and used in other examples, and embodiments of the present invention are not limited to LSU and VSU, which are used as examples herein. Once the set of opcodes is filtered in this manner, they are iterated one by one.

If the type of failure is a CPU/FPU miscompare, the method includes generating an architected verification program (AVP), at blocks 312 and 314. The AVP includes one or more operations that, when performed by the processor being tested, causes the failure to occur.

Figure 4:
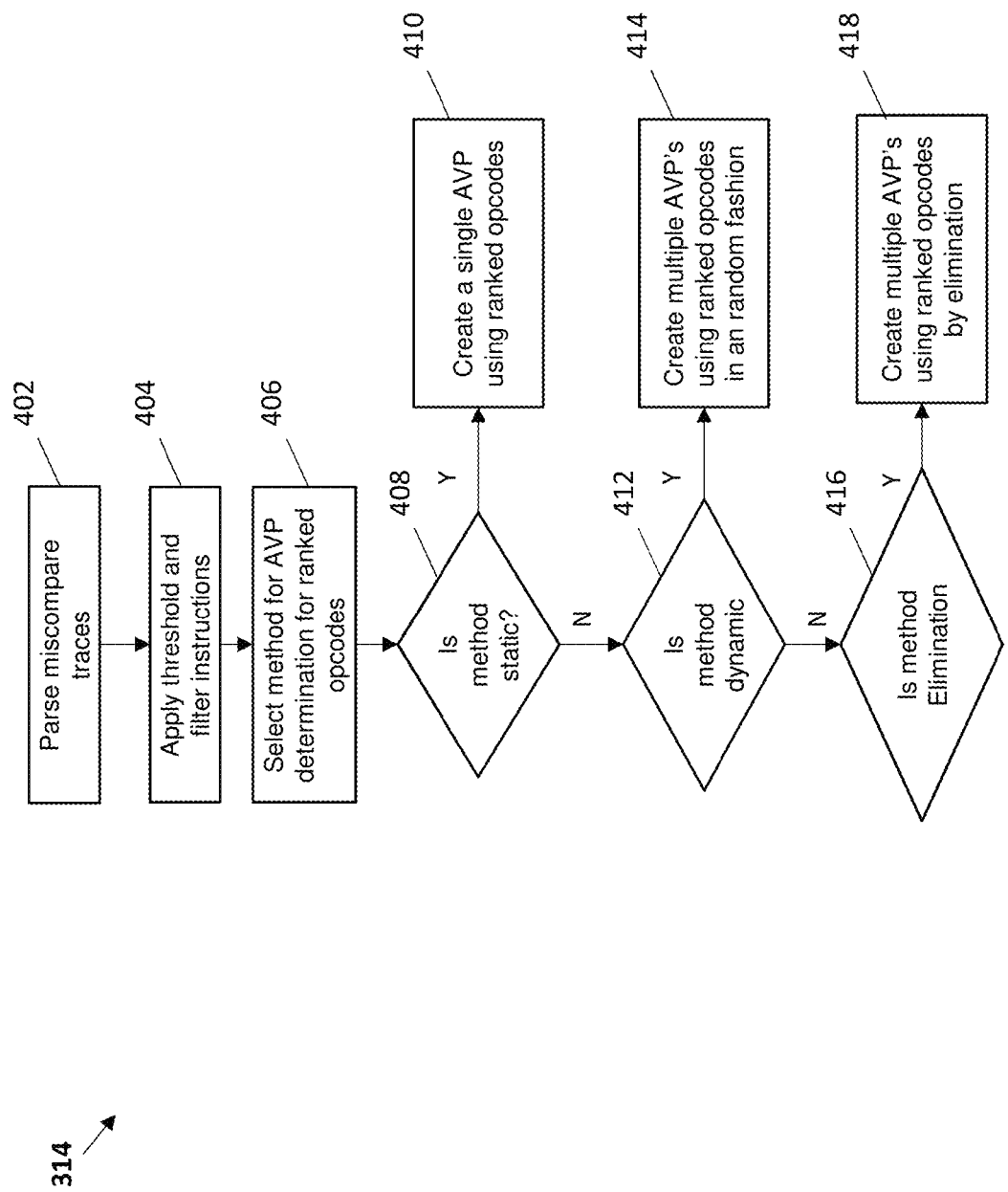
FIG. 4 depicts a flowchart of a method for creating an architecture verification program workload according to one or more embodiments of the present invention.

FIG. 4 depicts a flowchart of a method for creating an AVP workload according to one or more embodiments of the present invention. To create the AVP, miscompare traces from the software stack at the time of failure are parsed, at block 402. Parsing miscompare parsing can be performed using one or more known techniques. The parsing is performed to read opcodes in the miscompare traces. Opcodes with a repetition rate above a predetermined threshold are filtered/selected from these miscompare traces and added into an AVP, at block 404. The filtering includes selecting the set of opcodes and adding them to the AVP. In one or more examples, a template of an AVP is used and populated with the filtered opcodes. For example, if the miscompare trace includes an opcode OP1 at least T times, OP1 is added into the AVP, and if an opcode OP2 repeats less than T times in the instruction trace, OP2 is not included into the AVP. Here, T is a predetermined threshold and can be any integer.

Further, the AVP is optimized using at least one of from a group of optimizing techniques that includes static optimization, dynamic optimization, and elimination optimization, to arrive at suitable instruction set to be used for causing the failure to occur, at block 406. It should be noted that at least one of the predetermined optimization techniques is selected in an automated manner. The selection is based on an instruction mix that can resproduce the failure. In one or more embodiments of the present invention, the selection can start with static optimization, and if that does not result in the failure the dynamic optimization is selected. If that, too, does not result in the failure, the elimination optimization is used. In one or more examples, prior to using any one of the optimization techniques, the filtered opcodes from the miscompare traces are ranked, at block 406.

Figure 5:
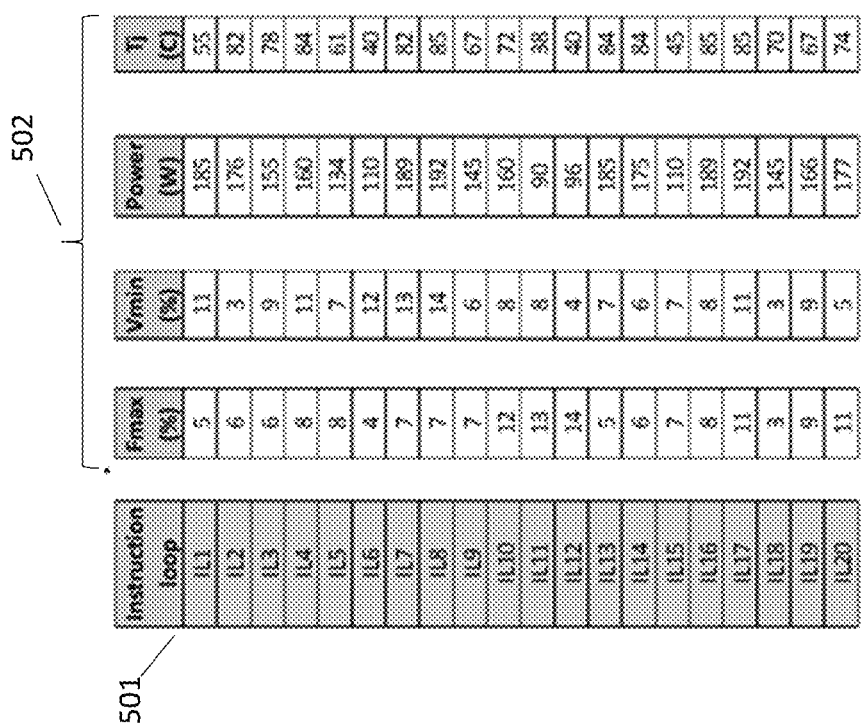
FIG. 5 depicts four parameters being used for ranking instructions loops according to one or more embodiments of the present invention.

The ranking is performed based on one or more parameters such as the maximum processor frequency (Fmax), the minimum voltage drawn by the processor (Vmin), the power consumed by the processor (Power), the temperature of the processor (Tj), and so on. It is understood that fewer and/or additional parameters can also be used in one or more embodiments of the present invention. FIG. 5 depicts four parameters 502 being used for ranking instructions loops IL1-IL20 501 according to one or more embodiments of the present invention. The instruction loops can be reordered based on the measured parameters, for example, in ascending order, in descending order, using weighted ranks, etc. It is understood that the example scenario depicted in FIG. 5 is just one possible example, and that in one or more embodiments of the present invention the values can be different than those depicted.

The static optimization includes opcodes of ranked instruction loops to create a single AVP workload, at blocks 408 and 410. Here an "instruction loop" includes a set of opcodes (machine instructions) corresponding to a function being executed in a high-level programming language in the software stack.

In case dynamic optimization is selected, the method includes combining opcodes of ranked instruction loops in a random manner to create several AVP workloads, at blocks 412 and 414. For example, consider that instructions loops ILL IL2, and IL3 are selected for creating dynamic optimization. A first AVP workload is created with opcodes in the order—IL1→IL2→IL3, while a second AVP workload is created with opcodes in the order IL3→IL2→IL1. Alternatively, or in addition, in one or more examples, the opcodes of the instruction loops are mixed with each other such that a first AVP workload includes portions of ILL IL2, and IL3; a second AVP workload includes a portion of IL1 and IL3; a third AVP workload includes remaining opcodes from ILL IL2, and IL3. It should be noted that the above are just some possible examples and that in one or more embodiments of the present invention the AVP workloads can be generated in any other randomized manner.

The elimination optimization includes eliminating one or more opcodes of ranked instruction loops to create a set of AVPs in case the elimination optimization is selected, at blocks 416 and 418. For example, consider that X opcodes are filtered and selected to create the AVP. The elimination optimization creates X sets of opcodes, in each set one of the X opcodes from the original set of X opcodes is eliminated. For example, consider that the original set of opcodes contains the X opcodes: OP1, OP2, OP3, . . . , OP(X−3), OP(X−2), OP(X−1), OPX. In this case, a first set created by the elimination optimization includes opcodes OP1, OP2, . . . , OP(X−2), and OP(X−1) from the original set; a second set includes opcodes OP1, OP2, . . . , OP(X−2), and OPX; and so on.

Further, in a similar manner, the elimination optimization eliminates two opcodes together to create (N/2) AVP workloads. For example, a first set can include the opcodes OP1, OP2, OP3, . . . , OP(X−3), and OP(X−2), from the original set. Further yet, in a similar manner, the elimination optimization eliminates three opcodes to create (N/3) AVP workloads. This sequence of elimination can be continued until a predetermined threshold or until a single instruction is left in the AVP workload.

Referring back to the flowchart in FIG. 3, in each of the cases of the type of detected failure, once the set of opcodes is created for repeatedly causing the detected failure, the method further includes performing a consistency failure check, at block 320. The consistency failure check is performed to ensure that the failure can be repetitively performed by executing the set of opcodes that are created. The consistent failure check is run over N runs for cycle reproducibility, N being a predetermined integer.

Figure 6:
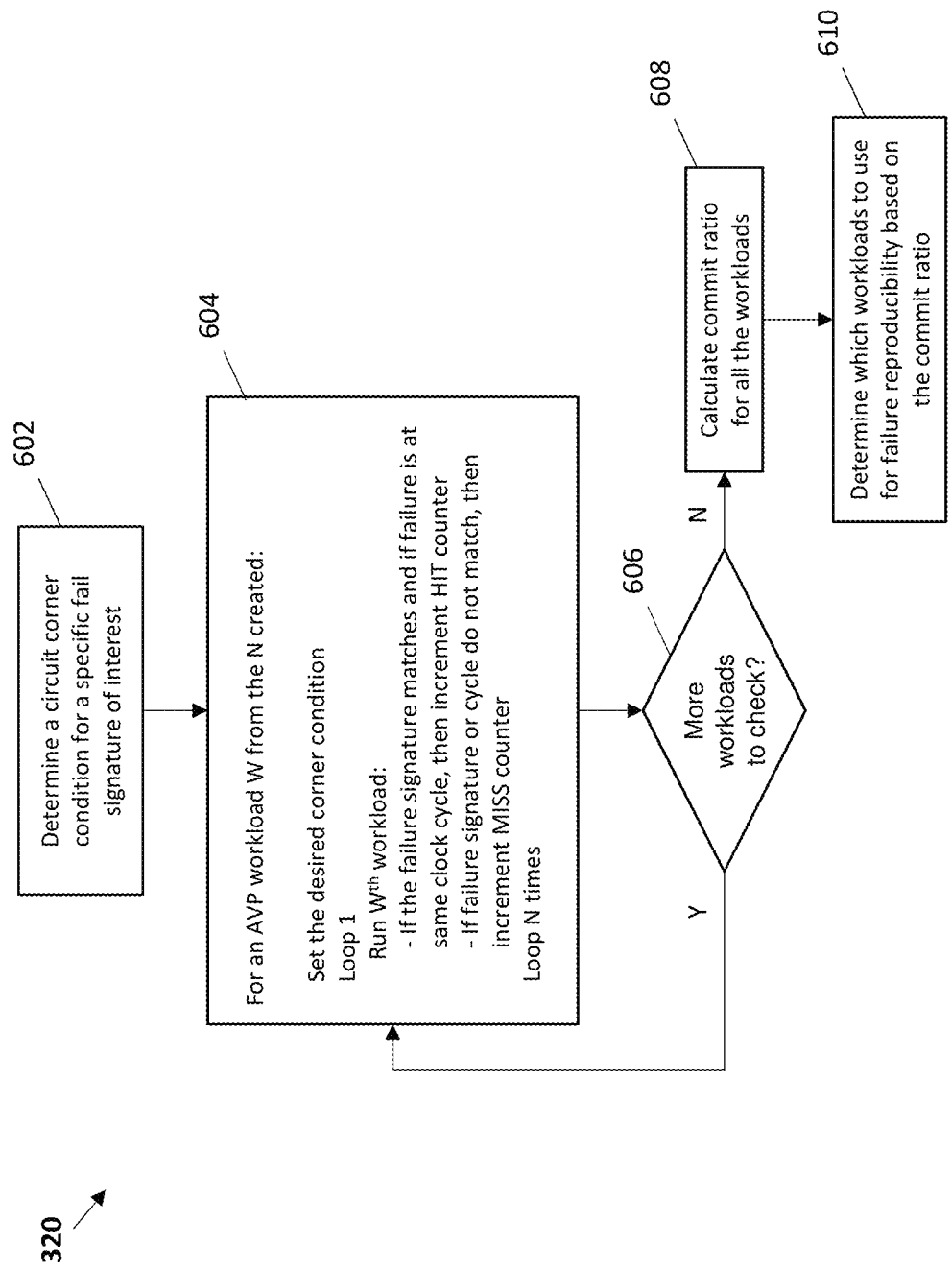
FIG. 6 depicts a flowchart of a method for performing a consistent failure check for determining cycle reproducibility according to one or more embodiments of the present invention.

FIG. 6 depicts a flowchart of a method for performing a consistent failure check for determining cycle reproducibility according to one or more embodiments of the present invention. The method includes determining a circuit corner condition for a specific failure signature of interest, at block 602. A circuit corner condition is a combination of voltage/frequency/temperature of the electric circuit of the processor at which the processor experienced the failure. The circuit corner condition can include a snapshot of registers and processor counters. A failure signature can be a set of particular values of one or more parameters being monitored. An example failure signature can be: Fmax=10, Vmin=5, Power=176, and Tj=55.

The method further includes a loop to check the number of times an AVP workload from the created set of instructions causes the failure condition to occur, at block 604. Executing the loop includes setting the desired corner condition for a failure condition that is to be reproduced, for example, particular register values and counter values. Each workload is executed a predetermined number of times, such as N. During each execution, an AVP workload W is executed and reproducibility of the failure is checked for the workload W. If the failure condition caused by the workload matches the desired corner condition, a first counter (HIT counter) is incremented. If the corner condition does not match, a second counter (MISS counter) is incremented instead. The counters are reset for each loop.

Determining if the failure condition matches the corner condition is based on the failure signature and the cycle at which the failure is detected. For example, the failure signature of the failure that is caused by the workload W has to match the failure signature that is set up as part of the desired corner condition. In addition, for the failure condition to match, the cycle at which the failure is created has to match the cycle at which the failure was detected originally. This is checked by comparing a snapshot of the registers and counters with the values set up as part of the corner condition.

The failure condition is considered to match the corner condition if both, the failure signature and the cycle, match.

The HIT and MISS counters are incremented through N iterations of the loop for each workload created. In case there are additional workloads to be checked, the above-described loop is repeated for a next workload, at block 606.

Figure 7:
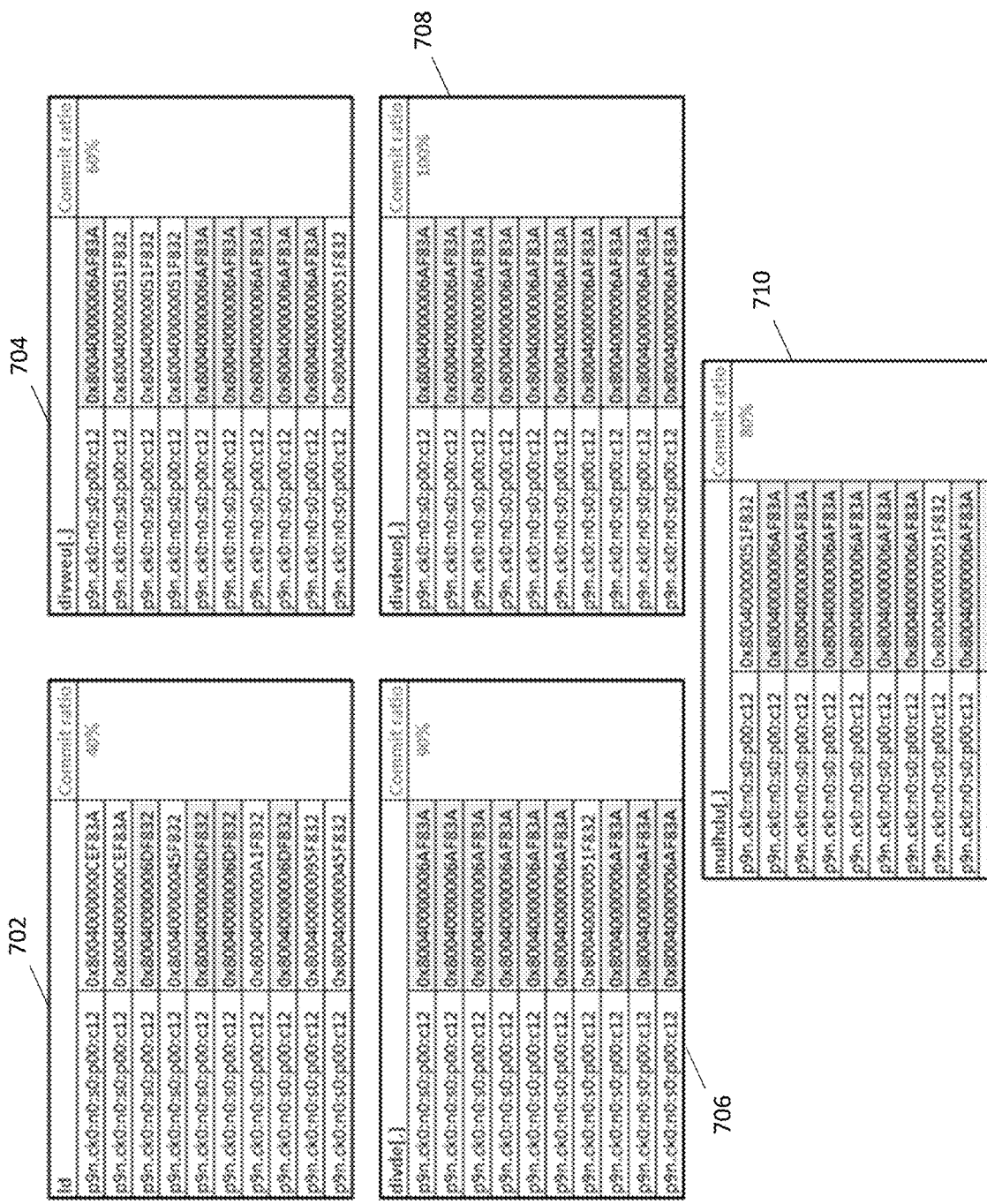
FIG. 7 depicts various examples of workloads and their respective consistency checks according to one or more embodiments of the present invention.

A commit ratio is computed for each workload, at block 608. The commit ratio is computed as HIT/N times for a given loop. For example, 8 hits out of 10 runs, results in a commit ratio of 80%. FIG. 7 depicts various examples of workloads and their respective consistency checks. In the depicted examples the result 702 for a first workload has a commit ratio of 40%, the result 704 for a second workload is 60%, the result 706 for a third workload is 90%, the result 708 for a fourth workload is 100%, and the result 710 for a fifth workload is 80%. It is understood that in one or more embodiments of the present invention the number of workloads executed can be different, and the commit ratios can be different from those in the depicted example.

Referring back to the flowchart of FIG. 6, the method includes determining which workloads to use for failure reproducibility based on the commit ratio, at block 610. If commit ratio is attained to achieve a stable (i.e., consistent) reproducibility, then the circuit conditions and workload are deemed to be usable for "cycle reproducibility." For example, if the commit ratio is above a predetermined threshold, for example, above 60%, 65%, or any other threshold, the workload is selected to be used for debugging and/or analyzing the failure.

The workloads selected in this manner are combined in one or more embodiments of the present invention.

Figure 8:
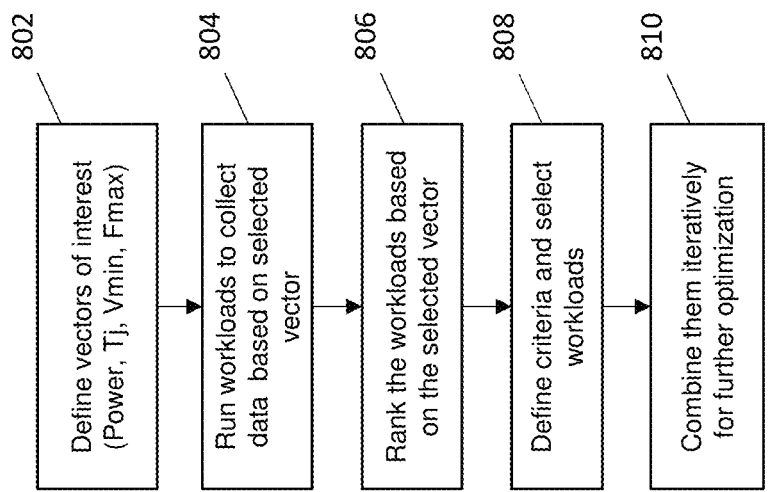
FIG. 8 depicts a flowchart of a method for combining one or more workloads created for failure analysis according to one or more embodiments of the present invention.

FIG. 8 depicts a flowchart of a method for combining one or more workloads created for failure analysis according to one or more embodiments of the present invention. The combining, which is also referred to as "tunneling", is performed to improve parametric effectiveness, or coverage to further optimize the failure analysis being performed using the created workloads.

The method for combining the workloads includes determining which parameters are to be used, coverage for these parameters(s) being increased by the combining. The coverage is increased by changing the parameter(s) towards respective maximum values at which the processor is known to be prone to failures. The method includes defining vectors of interest for the one or more parameters, such as Power, Tj, Vmin, Fmax, at block 802. Further, the method includes executing the AVP workloads and collecting the data for each of the parameters that are selected, at block 804. FIG. 5 depicts an example measured data 502 for various workloads IL1-IL2 501.

Figure 9:
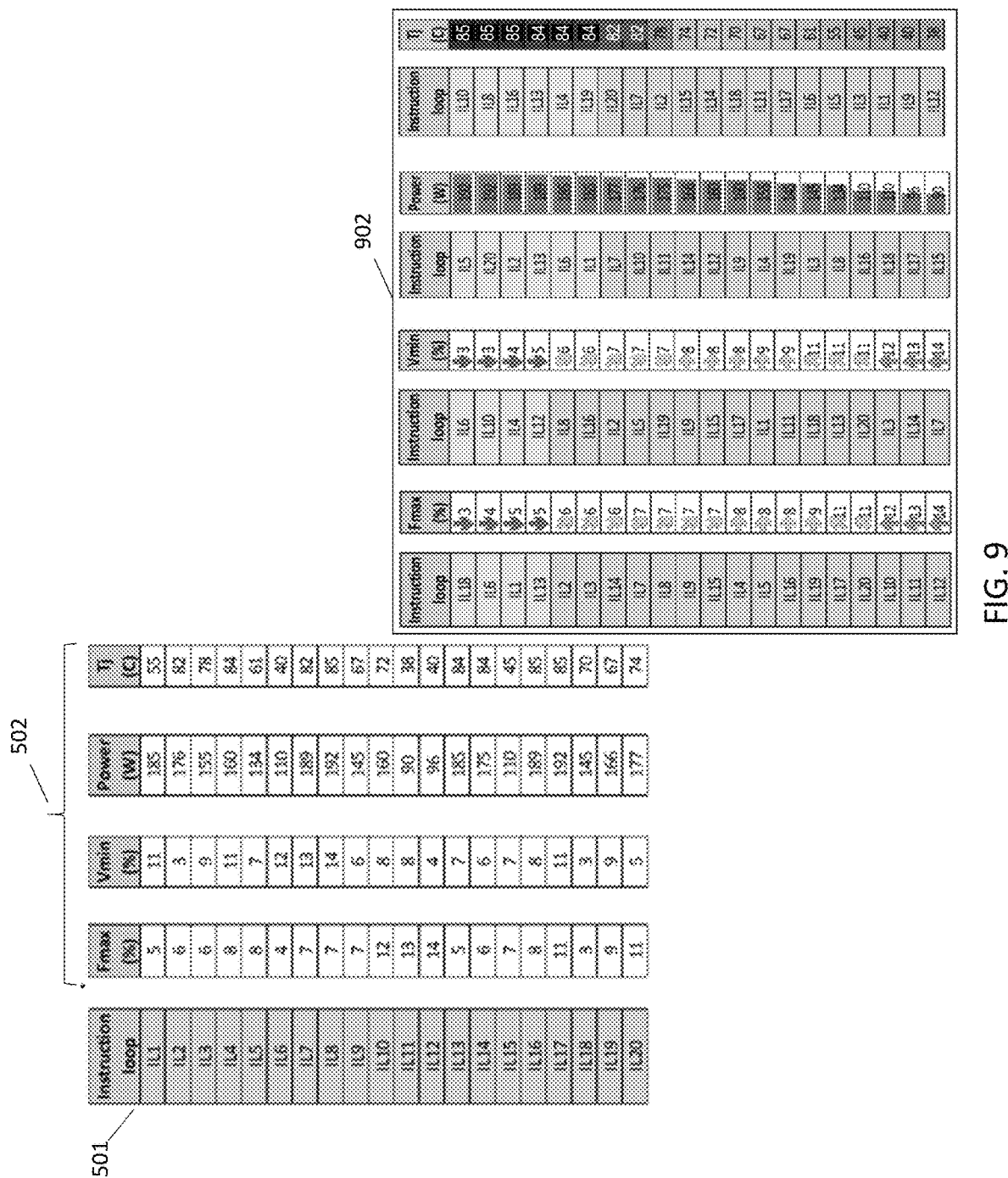
FIG. 9 depicts ranked workloads where the ranking is performed according to the different selected parameters.

The method further includes ranking the AVP workloads based on the selected vectors of parameters, at block 806. The ranking can be performed to order the workloads according to the measured data, for example, in ascending order, descending order, or any other scheme, such as a weighted scheme. FIG. 9 depicts ranked workloads 902, where the ranking is performed according to the different selected parameters.

The method further includes determining criteria for combining the workloads and selecting the workloads according to the criteria, at block 808. The criteria can be selected manually in one or more examples. The criteria can include having one or more parameters within a certain range, for example reducing Fmax to less than 1.

Further, the method includes combining the workloads iteratively, at block 810. The iterative combining includes combining 2 workloads, and if the criteria are not met, further combining additional workloads, until either the criteria are met or until all workloads are combined.

Figure 10:
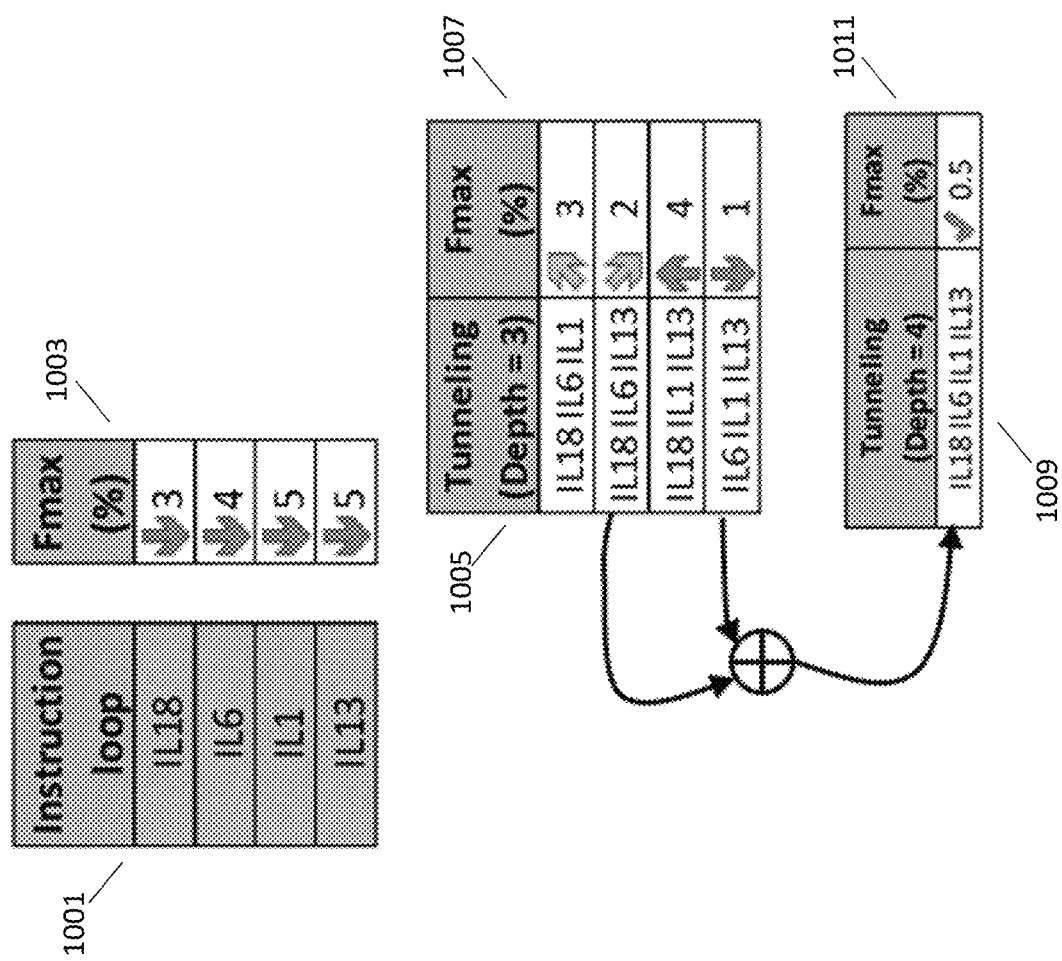
FIG. 10 depicts an example iterative combining of workloads according to one or more embodiments of the present invention.

FIG. 10 depicts an example iterative combining of workloads according to one or more embodiments of the present invention. The workloads 1001 are the selected workloads for combining. The corresponding Fmax values 1003 caused by execution of the workloads 1001 are also shown. By combining three of the workloads together to form workloads 1005, the Fmax values 1007 can be obtained. The Fmax values 1007 are obtained by executing the combined workloads 1005. The combined workloads 1005 are at "depth=3" because they are each a combination of three of the workloads 1001. In this case, a further combination of the workloads 1001 at depth=4 leads to the workload 1009 and corresponding Fmax value 1011 satisfies the criteria that were decided (Fmax<1).

Accordingly, one or more embodiments of the present invention facilitate creating one or more workloads (or instruction loops) for consistently reproducing a processor failure. The workloads are created on the processor itself (and not in a simulated environment) so that the conditions for the failure can be exactly reproduced. For example, the register values, counter values, Fmax, Tj, Power, Vmin, and other such parameters are reproduced for the failure so that an accurate analysis/debugging of the failure can be performed. Further yet, one or more embodiments of the present invention facilitate optimizing the workloads using various techniques. Further yet, in one or more embodiments of the present invention, the workloads created are combined to ensure one or more criteria such as Fmax, Tj, Vmin, Power can be satisfied according to a predetermined criterion.

In other words, one or more embodiments of the present invention facilitate, in the field of processor failure analysis and debug, generating workloads to aid efficient and seamless debug. In one or more embodiments of the present invention, miscompare traces from bare metal software stack that were originated out at the time of failure are parsed to determine opcodes that were executed that led to the failure. One or more embodiments of the present invention filter out the opcodes with a high repetition rate above a threshold, from these miscompare traces. Further, from the filtered opcodes, one or more workloads are created, which can quickly and consistently cause the failure. To optimize the workload, one or more embodiments of the present invention use one from a group of optimization techniques that includes static, dynamic, and elimination algorithms. The optimization further filters the opcodes to arrive at an efficient opcode set that causes the failure. Further yet, once the instruction loops of interest are identified, one or more embodiments of the present invention further optimize the workloads to achieve a coverage of interest using a tunneling procedure. This second optimization facilitates covering quantification, ranking based on coverage of one or more processor parameters.

Accordingly, one or more embodiments of the present invention facilitate narrowing down the circuit failure of interest and identifying instruction loops that achieves specific coverage of interest, but at the same time guarantees circuit coverage to cover the circuit failure.

The present invention may be a system, a method, and/or a computer program product at any possible technical detail level of integration. The computer program product may include a computer-readable storage medium (or media) having the computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source-code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instruction by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for instruction-level tracing for analyzing processor failure to debug a circuit of a processor, the computer-implemented method comprising:
    detecting, by the processor, a failure during operation of the processor;
    parsing, by the processor, a miscompare trace to determine a plurality of opcodes executed by the processor prior to the failure, the miscompare trace comprising an instruction stream executed by the processor, wherein the instruction stream comprises the opcodes, which indicate machine instructions executed by the processor;
    generating, by the processor, a workload comprising a set of opcodes by filtering the set of opcodes from the miscompare trace;
    performing, by the processor, a consistency check of the workload to determine a commit ratio of the workload, the commit ratio indicative of a number of times the failure occurs when the workload is executed a predetermined number of times; and
    executing, by the processor, the workload for debugging the failure based on the commit ratio being above a predetermined threshold.

2. The computer-implemented method of claim 1, wherein generating the workload comprises determining a type of the failure and filtering the set of opcodes based on the type of the failure.

3. The computer-implemented method of claim 2, wherein, based on the type of the failure being core/thread hang, filtering the set of opcodes comprises searching for the last opcode that caused the failure.

4. The computer-implemented method of claim 2, wherein, based on the type of the failure being one associated with a specific component circuit of the processor, filtering the set of opcodes comprises searching for opcodes that are specifically executed by the specific component circuit.

5. The computer-implemented method of claim 4, wherein the specific component circuit is one from a group of component circuits comprising a load-store unit, an instruction-fetch unit, and a vector/scalar execution unit.

6. The computer-implemented method of claim 2, wherein, based on the type of the failure being a CPU/FPU miscompare, filtering the set of opcodes comprises identifying one or more opcodes that are repeated at least a predetermined number of times and including the one or more opcodes in the workload.

7. The computer-implemented method of claim 6, wherein the method further comprises, optimizing the workload by selecting an optimizing algorithm from a group comprising static optimization, dynamic optimization, and elimination optimization.

8. A system comprising:
a memory; and
a processor coupled with the memory, the processor configured to perform a method for instruction-level tracing for analyzing a processor failure, the method comprising:
detecting a failure during operation of the processor circuit;
parsing a miscompare trace to determine a plurality of opcodes executed by the processor prior to the failure, the miscompare trace comprising an instruction stream executed by the processor, wherein the instruction stream comprises the opcodes, which indicate machine instructions executed by the processor;
generating a workload comprising a set of opcodes by filtering the set of opcodes from the miscompare trace;
performing a consistency check of the workload to determine a commit ratio of the workload, the commit ratio indicative of a number of times the failure occurs when the workload is executed a predetermined number of times; and
executing the workload for debugging the failure based on the commit ratio being above a predetermined threshold.

9. The system of claim 8, wherein generating the workload comprises determining a type of the failure and filtering the set of opcodes based on the type of the failure.

10. The system of claim 9, wherein, based on the type of the failure being core/thread hang, filtering the set of opcodes comprises searching for the last opcode that caused the failure.

11. The system of claim 9, wherein, based on the type of the failure being one associated with a specific component circuit of the processor, filtering the set of opcodes comprises searching for opcodes that are specifically executed by the specific component circuit.

12. The system of claim 11, wherein the specific component circuit is one from a group of component circuits comprising a load-store unit, an instruction-fetch unit, and a vector/scalar execution unit.

13. The system of claim 9, wherein, based on the type of the failure being a CPU/FPU miscompare, filtering the set of opcodes comprises identifying one or more opcodes that are repeated at least a predetermined number of times and including the one or more opcodes in the workload.

14. The system of claim 13, wherein the method further comprises, optimizing the workload by selecting an optimizing algorithm from a group comprising static optimization, dynamic optimization, and elimination optimization.

15. A computer program product comprising a computer-readable storage medium having program instructions embodied therewith, the program instructions executable by a processing circuit to perform a method for instruction-level tracing for analyzing a processor failure, the method comprising:
detecting a failure during operation of a processor circuit;
parsing a miscompare trace to determine a plurality of opcodes executed by the processor prior to the failure, the miscompare trace comprising an instruction stream executed by the processor, wherein the instruction stream comprises the opcodes, which indicate machine instructions executed by the processor;
generating a workload comprising a set of opcodes by filtering the set of opcodes from the miscompare trace;
performing a consistency check of the workload to determine a commit ratio of the workload, the commit ratio indicative of a number of times the failure occurs when the workload is executed a predetermined number of times; and
executing the workload for debugging the failure based on the commit ratio being above a predetermined threshold.

16. The computer program product of claim 15, wherein generating the workload comprises determining a type of the failure and filtering the set of opcodes based on the type of the failure.

17. The computer program product of claim 16, wherein, based on the type of the failure being core/thread hang, filtering the set of opcodes comprises searching for the last opcode that caused the failure.

18. The computer program product of claim 16, wherein, based on the type of the failure being one associated with a specific component circuit of the processor, filtering the set of opcodes comprises searching for opcodes that are specifically executed by the specific component circuit.

19. The computer program product of claim 16, wherein, based on the type of the failure being a CPU/FPU miscompare, filtering the set of opcodes comprises identifying one or more opcodes that are repeated at least a predetermined number of times and including the one or more opcodes in the workload.

20. The computer program product of claim 19, wherein the method further comprises, optimizing the workload by selecting an optimizing algorithm from a group comprising static optimization, dynamic optimization, and elimination optimization.

* * * * *